Aug. 20, 1968  R. SWART ET AL  3,398,326
SOLID-STATE ELECTRICAL COMPONENT COMBINING MULTIPLE
CAPACITORS WITH OTHER KINDS OF IMPEDANCE
Filed Aug. 25, 1965
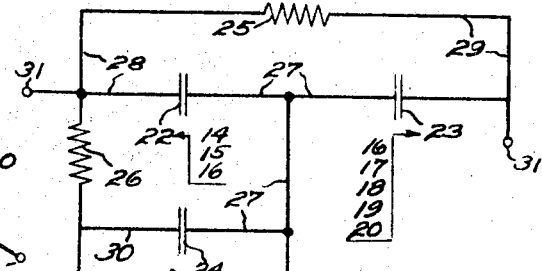
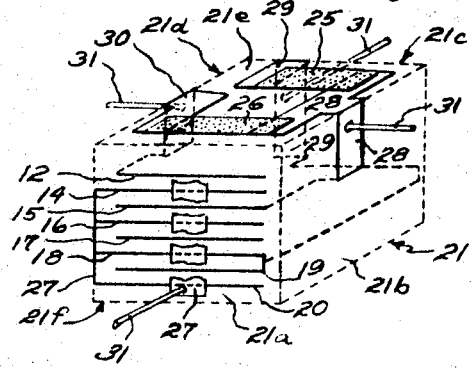
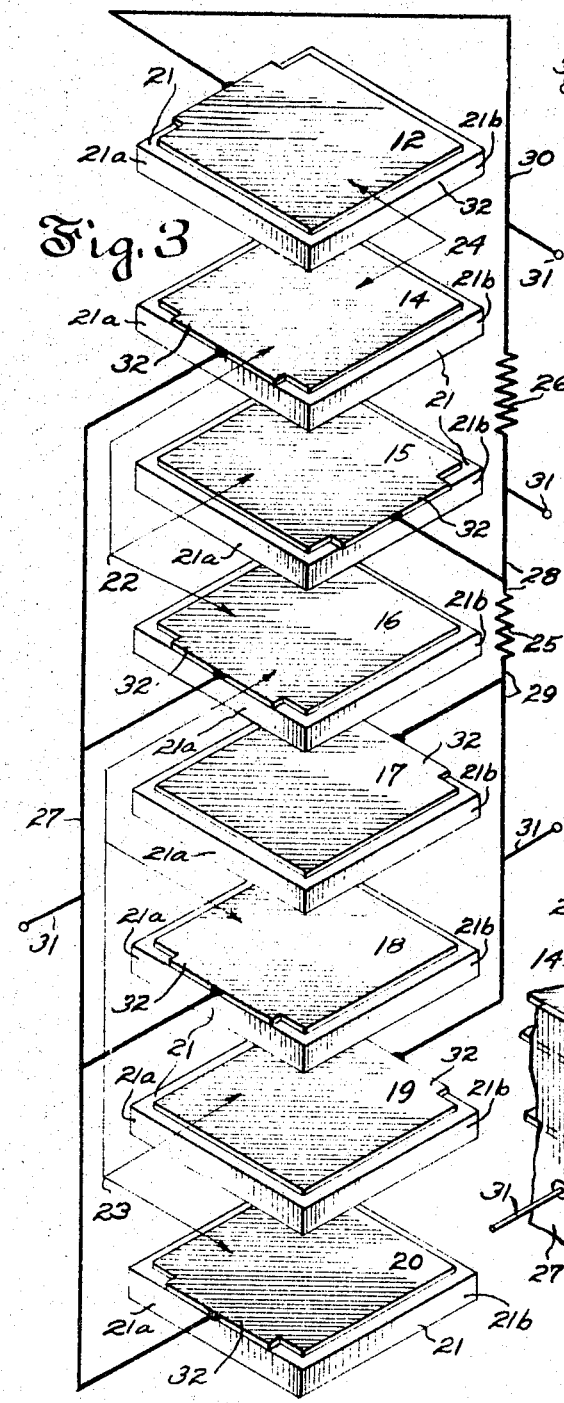
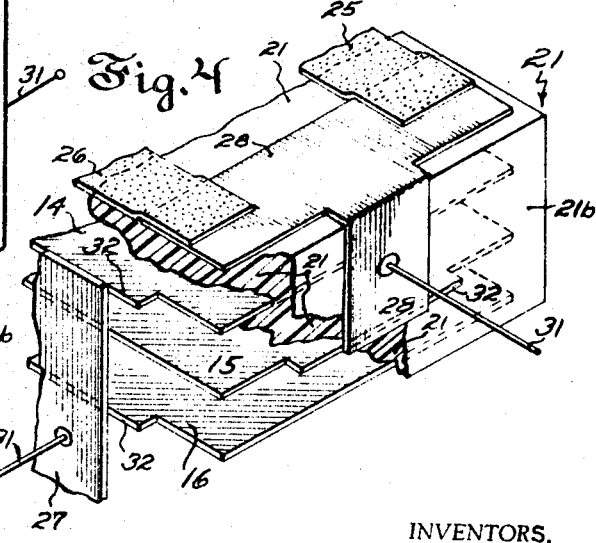
INVENTORS,
Robert Swart
Irving Berlin
BY
ATTORNEY United States Patent Office 3,398,326
Patented Aug. 20, 1968

3,398,326
SOLID-STATE ELECTRICAL COMPONENT COMBINING MULTIPLE CAPACITORS WITH OTHER KINDS OF IMPEDANCE
Robert Swart, Newtown, and Irving Berlin, Bridgeport, Conn., assignors to Vitramon, Incorporated, Monroe, Conn., a corporation of Delaware
Filed Aug. 25, 1965, Ser. No. 482,544
4 Claims. (Cl. 317—101)

This invention relates to a solid-state electric circuit component comprising a laminate body of miniature or subminiature size provided with electric terminals for installation in electronic circuits.

Specifically the present improvements concern laminates of electrode layers embedded in a body of dielectric and having the ability to function in electric circuitry as do conventional hookups of structurally separate, wire connected impedances, such as capacitors, resistors, thermistors, diodes, rectifiers, inductors, transistors, and other semiconductors.

An object of the invention is so to construct a single bodied electric component having the said functioning abilities that it can be mass produced without appreciable increase in cost over laminates of a simpler kind heretofore proposed which can function only as single or multiple capacitors as distinguished from a network of multiple mixed impedances.

Another object is to provide a construction of such component that can be produced by methods of manufacture disclosed in United States Patent No. 2,779,975 granted Feb. 5, 1957, to Lee and Weller, owned by the assignee of the present application.

A further object is to provide in a single bodied electrical component, multiple groupings of electrode layers having individual and/or group terminations that are accessible externally of the dielectric body of the laminate for interconnection in a choice of network relationships by means of a plurality of electrically separate, conductive means extending along different boundary faces of the dielectric body while connected to some of the electrode layers and insulated from others. Thus external circuit leads may be attached to a choice of such conductive means to produce a wider variety of network relationships of the electrode layers which can thereby be electrically grouped to serve as multiple capacitors cooperative with built-in impedances of other kinds.

It has been proposed to incorporate electrodes as layers of conductive material embedded within a body of dielectric to serve as capacitors, for which purpose it has been proposed to place electrode layers on opposite faces of the same stratum of dielectric whereby electrode layers in different dielectric strata can mutually contact to establish electrical communication from stratum to stratum. As it is impractical to produce such a construction by the more efficient method of manufacturing solid bodied components disclosed in the aforesaid United States patent, the present improvements open up to that patented method the ability to produce improved circuit components at less cost and that can function to simulate a greater variety of network patterns.

These and other objects of the invention will become clear in greater detail from the following description of a successful example of the herewith improved structure of a solid-state component, in which description reference is had to the accompanying drawing wherein:

FIG. 1 is a schematic block diagram representing a solid-state circuit component embodying the present invention and showing a typical pattern of its electrical conductors.

FIG. 2 is a wiring diagram showing a conventional hookup of separate wire connected electrical impedances whose functioning is duplicated by the single solid-state component of FIG. 1.

FIG. 3 shows the electrode layers and intervening strata of dielectric of FIG. 1 exploded to more clearly reveal their relative positions, shapes and functional relationship.

FIG. 4 is an enlarged perspective view of a corner portion of the circuit component diagrammed in FIG. 1 showing the dielectric body partially broken away to illustrate the herewith improved means for electrically coupling the electrodes in selected groupings so as to form more complex networks of impedances than heretofore.

Possibilities of combining plural capacitors with other kinds of impedances in widely variable arrangements are opened up by the principle of arranging electrode layers and surface conductors as typified in FIG. 3 of the drawing. Here, for example, there are eight independent electrode layers designated respectively 12, 14, 15, 16, 17, 18, 19 and 20, supported in a common column and separated by strata of a dielectric which preferably is in the form of a prismatic body, slab or block 21 having four lateral faces 21a, 21b, 21c and 21d and in addition a top face 21e and a bottom face 21f. FIG. 1 is a block diagram of such a body having embedded therein the aforesaid eight electrode layers superimposed in a single column and carrying on the top insulative face 21e of the body two strips 25 and 26 of at least partially conductive material which function as separate resistors. The column of electrode layers is flanked by the aforesaid lateral faces of the dielectric body 21, and is traversed by its top surface 21e.

FIG. 3 shows that each of the eight electrode layers conforms to a four sided figure and has at least a portion of its boundary edge exposed at some one of the column flanking faces of the dielectric body 21, the remainder of each electrode layer being embedded in and sealed off by the dielectric. Thus electrode 12 has one edge exposed at the body face 21d, electrode 15 has an edge exposed at a different body face 21b, electrodes 17 and 19 have edges exposed at a common different body face 21c, and each of electrodes 14, 16, 18 and 20 has an edge exposed at another common body face 21a. Such exposure of the several electrode edges is afforded by conductive tongue formations, typified as 32 in FIG. 3, extending from a single edge of each electrode layer.

The tongues 32 of selected electrodes are electrically connected by stripes of conductive material 27, 28, 29 and 30, stripe 27 being on the body face 21a in contact with only the electrode layers 14, 16, 18 and 20, stripe 28 connecting electrode 15 with only the resistors 25 and 26, stripe 29 connecting only electrodes 17 and 19, and stripe 30 connecting electrode 12 with only said resistor 26. Since each of the stripes is carried by a different body face, crowding and electrical interference between the stripes, even if there are many of them, is avoided. These stripes can comprise delineated deposits of a conductive composition containing metallic particles painted, sprayed, stenciled or otherwise applied to the face of the dielectric body 21 to serve as conductors so as to make the electrode coupling connections indicated in FIGS. 1 and 3. To each of the conductive stripes 27, 28, 29 and 30 may be affixed, by solder or other conventional form of attachment, a projecting electric terminal or lead designated typically as 31, suitable for attachment to external circuit lines for placing the built-in impedances of the component in selected pattern communication with components of an outside circuitry. The terminals 31 may directly outstand from the face of the block in respectively different directions or may overlap or parallel the faces of the laminate body by which they are carried and thus project from the laminate in a common direction.

In FIG. 3 the electrodes are indicated to be electrically connected by the aforesaid stripes in selected groups to form multiple capacitors in network association with two resistors 25 and 26 thereby to simulate in electrical effect an open network of corresponding but structurally separate impedances connected as indicated in the diagram of wiring connections in FIG. 2. So arranged, electrodes 12 and 14 function as one capacitor 24, electrodes 16, 17, 18, 19 and 20 as another capacitor 23, and electrodes 14, 15 and 16 as a third capacitor 22.

In FIG. 1 the conductive stripe 28 on the lateral surface 21b of the laminate is seen to be connected to the tongue 32 on electrode 15, and to extend around the top corner of the laminate and onto its top surface 21e where stripe 28 branchs in two opposite directions and connects to one terminal of each resistor 25 and 26. Correspondingly, the stripe 29 on laminate surface 21c connects the tongues 32 on electrodes 17 and 19 and also extends around another top corner of the laminate and onto its top surface 21e connecting to the opposite terminal of resistor 25. Stripe 30 on the lateral surface 21d of the laminate connects the tongue 32 on electrode 12 with only the resistor 26 and likewise extends around a top corner of the laminate and onto its top surface 21e. Stripe 27, however, is confined to lateral surface 21a of the laminate and serves to connect only the four electrodes 14, 16, 18 and 20. This results in an ability of the component to function as three capacitors 22, 23, 24 formed respectively by electrode group 14, 15 and 16, group 16, 17, 18, 19 and 20 and group 12 and 14.

The electrical interconnection of these three capacitors with the aforesaid resistors 25 and 26 will be clear from FIGS. 1 and 3 where the resistor 25 bridges the space on the top surface 21e of the laminate between stripe 28 and stripe 29, and resistor 26 bridges the space between stripes 28 and 30. These resistors may be coatings of a cermet or any suitable resistive substance applied on the top surface 21e of the laminate by stenciling, painting, spraying or other appropriate method and having electrical properties suitable to the circuitry. They may partially overlap the end portions of the conductive stripes which they serve to connect and by which they are connected into circuitry with the capacitors as indicated in FIG. 3.

As guide lines for practicing the invention in a component of relatively miniature size, the following specifications may be considered without being interpreted as in any way limiting the permissible departure therefrom within the coverage of the appended claims.

In a component having capacitor ratings in a range between .01 mf. and .3 mf. and resistive values in a range between 10 ohms and 10 megohms, the three dimensions of the laminate body may each range from .2" x .2" x .05" to 1" x 1" x .2" and the dielectric body 21 may be proportioned as a relatively thin slab or as a block of more chunky proportions or as an elongate prism. The electrode layers aside from their tongues 32 may be square, rectangular, round or of some other shape and slightly smaller in area than the transverse dimensions of the dielectric body in which they are embedded. Any of the described groups of electrode layers may contain any desired multiple of the number of individual layers shown in the drawing depending on the capacitive ratings desired. The stripes 27, 28, 29 and 30 need be no thicker than .001" nor wider than .020" and the same is true of the resistors 25 and 26.

The appended claims are directed to and intended to cover all variations from specification given herein which come within the principles of the invention as defined by a broad interpretation of the wording of the claims.

What is claimed is:

1. A solid state electronic component comprising a monolithic body having two generally planar major surfaces and at least three minor surfaces, a plurality of layers of dielectric material having their major surfaces oriented in a plane substantially parallel to the major surfaces of the body, and a plurality of layers of conductive material alternating with the dielectric material layers, each layer of conductive material comprising a single veneer substantially conforming to and confined within the boundaries of the preceding dielectric material layer and a projecting tongue extending outwardly in the plane of the veneer to at least the edge of the monolithic body, the layers of conductive material being divided into at least three sub-groups, the projecting tongues of the conductive layers of each sub-group extending to a different minor surface of the monolithic body; and, a conductive stripe superimposed on each of at least three of the minor surfaces of said monolithic body, each stripe being in electrical communication with the projecting tongues of the conductive layer sub-group exposed to that minor surface to electrically inter-connect the conductive layers corresponding to that sub-group, the conductive stripes and conductive layers cooperating to form at least two capacitive elements in the monolithic body.

2. A solid state electronic component as defined in claim 1 further comprising at least one additional impedance element mounted on at least one of the major surfaces of the monolithic body; and, at least one of the conductive stripes being extended from its minor surface interconnection with the projecting tongues exposed to that surface onto at least one of the major surfaces having an additional impedance element thereon to electrically connect at least one of the capacitive elements and at least one additional impedance element.

3. A solid state electronic component as defined in claim 2 wherein said additional impedance element is a resistor.

4. A solid state electronic component as defined in claim 2 wherein each of said conductive stripes has a conductive lead extending outwardly from the monolithic body to electrically connect the internal circuit comprised of at least two capacitive elements and at least one additional impedance element to external circuitry.

References Cited

UNITED STATES PATENTS

| 2,131,018 | 9/1938 | Scott | 317—261 |
| 2,919,483 | 1/1960 | Gravley | 317—261 |
| 2,960,754 | 11/1960 | Coda et al. | 317—261 X |
| 3,235,939 | 2/1966 | Rodriguez et al. | |

ROBERT K. SCHAEFER, *Primary Examiner.*

D. SMITH, *Assistant Examiner.*